United States Patent
De et al.

(10) Patent No.: US 8,341,256 B2
(45) Date of Patent: Dec. 25, 2012

(54) LOCAL CONTROL NETWORK PROCESSOR (LCNP) EMULATOR FOR MULTI-GENERATION CONTROL SYSTEMS

(75) Inventors: Rahul De, Karnataka (IN); Anand Sunit, Karnataka (IN); Nagore Hanifa Sikkandar Basha, Karnataka (IN); Sakthivel Renganathan, Karnataka (IN); Sarayu Subramanyam, Karnataka (IN); Neha Parasharami, Karnataka (IN); Ravi Gupta, Karnataka (IN); Steven Roby, Glendale, AZ (US); Piotr Golenko, Phoenix, AZ (US); Avinash Rajan, Karnataka (IN); Vilas Ingle, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 301 days.

(21) Appl. No.: 12/944,082

(22) Filed: Nov. 11, 2010

(65) Prior Publication Data

US 2012/0124240 A1     May 17, 2012

(51) Int. Cl.
*G06F 15/173* (2006.01)
(52) U.S. Cl. ........................ 709/223; 709/249
(58) Field of Classification Search .............. 700/65, 700/108–112; 709/200, 206, 217–219, 223–224, 709/245, 249
See application file for complete search history.

(56) References Cited

U.S. PATENT DOCUMENTS

| | | | |
|---|---|---|---|
| 5,784,538 A * | 7/1998 | Dzyacky | 706/45 |
| 5,867,673 A * | 2/1999 | Gustin et al. | 710/315 |
| 5,892,939 A | 4/1999 | Call et al. | |
| 6,128,315 A * | 10/2000 | Takeuchi | 370/466 |
| 6,654,356 B1 | 11/2003 | Eidson et al. | |
| 2006/0070010 A1 | 3/2006 | Retlich | |
| 2006/0291438 A1 | 12/2006 | Karschnia et al. | |
| 2009/0043415 A1 | 2/2009 | Sun et al. | |

* cited by examiner

*Primary Examiner* — Brendan Higa
(74) *Attorney, Agent, or Firm* — Jetter & Associates, P.A.

(57) ABSTRACT

A multi-generation distributed control system includes a first generation (FG) DCS connected to a local control network (LCN) including FG client nodes. A second generation (SG) DCS connected to a non-LCN data highway includes a server node connected between the LCN and the non-LCN data highway and SG client nodes. The server node includes a LCN processor (LCNP) board. LCNP emulator software including a server LCNP emulator software component is at the server node and a client LCNP emulator software component at the SG client nodes. The server LCNP emulator software component translates between LCN data and data highway protocol data and adds one of a plurality of LCN address slots to communications received from the LCN for delivery to the SG DCS that each correspond to a SG client node. Each client LCNP emulator software component provides one of the LCN address slots at its SG client node.

15 Claims, 2 Drawing Sheets

LOCAL CONTROL NETWORK PROCESSOR (LCNP) EMULATOR FOR MULTI-GENERATION CONTROL SYSTEMS

FIELD

Disclosed embodiments relate to distributed process control systems including first and second control systems from different generations that cannot communicate directly.

BACKGROUND

Automated plant control systems include a comprehensive set of algorithms and auxiliaries to control and monitor various processes within, for instance, a manufacturing facility. The control systems can be tailored to satisfy a wide range of process requirements globally or within specified portions of the facility. Conventionally, the control systems include a plurality of modules, each having its own hardware, firmware and software, linked together by a communication bus to provide a distributed process control system. The distributed nature of the system affords high performance with the capability to expand the system incrementally to satisfy growth or modifications in the manufacturing facility.

Manufacturing facilities may have two different generation distributed control system (DCS) platforms that cannot communicate directly, with the newer generation system allowing the manufacturing facility to migrate portions of their existing system or expand it to increase production. To integrate the two generations of systems and help provide the customers a single window view of both systems, "T-Nodes" are known. "T-nodes" include EXPERION server-total plant solution (ESVT), EXPERION station-TPS (ES-T) and Application Control Environment-TPS (ACE-T) nodes as a group of second generation control nodes that have local control network processor (LCNP) cards in them, such as for integrating a later (i.e., second) generation EXPERION process knowledge system (PKS) system and an earlier (i.e., first) generation TPS system, all provided by HONEYWELL INTERNATIONAL INC. A local control network (LCN)-connected EXPERION console station (ES-C) provides a common operator interface for both the TPS system and a PKS system. Such an ES-C directly connects to the nodes in the TotalPlant Network (TPN) associated with the TPS system via a physical LCNP board, and connects to the nodes in the PKS system through an EXPERION Server. In the receipt direction, the T-nodes act as an interface to access the data/alarms from the TPS to reach client nodes in the PKS system.

A LCNP board and MAU is required for each T-Node. MAU stands for "Media Access Unit" and is a HONEYWELL INTERNATIONAL hardware interface between the physical LCN coaxial A and B cables and the LCNP card via a serial interface connector. This significant hardware requirement leads to a substantial increase in system cost for setting up the various T-Nodes.

SUMMARY

Disclosed embodiments include multi-generation distributed control systems that include a first generation (FG) DCS connected to a local control network (LCN) including FG client nodes and a second generation (SG) DCS connected to a non-LCN data highway. The SG-DCS includes a server node that is connected between the LCN and the non-LCN data highway and the SG client nodes. Due to different data protocols used, nodes in the respective FG DCS and SG DCS cannot communicate directly to one another. The server node includes a LCN processor (LCNP) board. LCNP emulator software including a server LCNP emulator software component is at the server node and a client LCNP emulator software component is at the SG client nodes. The server LCNP emulator software component translates between LCN data and data highway protocol data and adds one of a plurality of LCN address slots to communications received from the LCN for delivery to the SG DCS that each correspond to a SG client node. Each client LCNP emulator software component provides one of the LCN address slots at its SG client node.

Disclosed embodiments thus remove the conventional requirement for the T-Nodes in the system to each have a dedicated LCNP Board to interface to the LCN to access all data/alarms from the FG DCS system or send messages to nodes in the FG DCS. Only the server node includes a physical LCNP Board in the complete MG-DCS systems disclosed herein, thus simplifying the overall system and saving cost.

DETAILED DESCRIPTION

Figure 1:
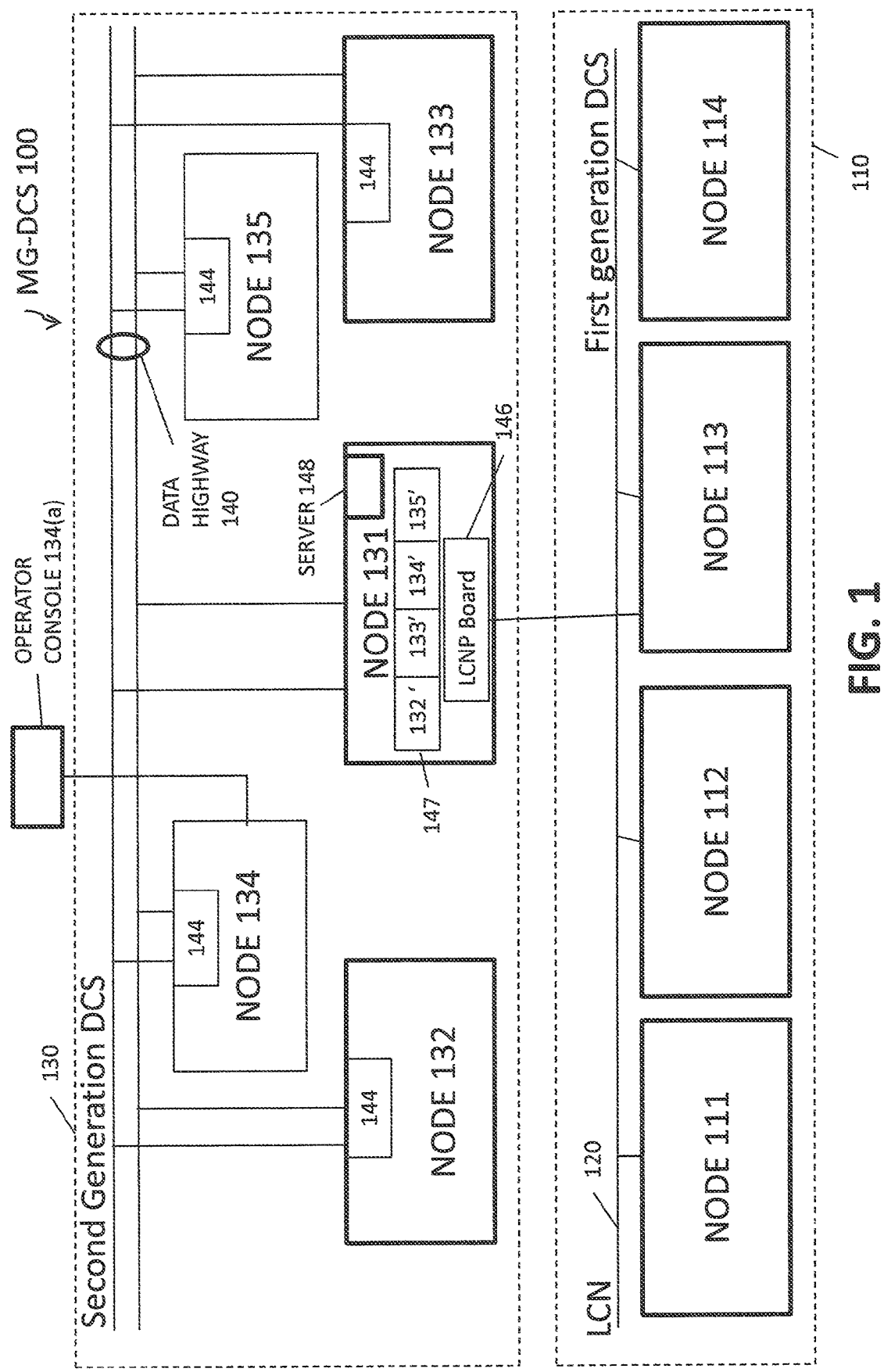
FIG. 1 is a block diagram representation of an example multi-generation distributed control system (MG-DCS), according to a disclosed embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

FIG. 1 is a block diagram representation of an example multi-generation distributed control system (MG-DCS) 100 comprising FG DCS 110 and SG DCS 130, according to a disclosed embodiment. Due to different data protocols used, nodes in the respective FG DCS 110 and SG DCS 130 that cannot communicate directly to one another. MG-DCS 100 provides overall supervision of a controlled process by a plant operator at an operator console at any one of the client nodes in the SG DCS 130, and enables obtaining all the information needed for the operator to perform the supervisory and control function across both FG DCS 110 and SG DCS 130. An operator console can also be at one of the client nodes in the FG DCS 110. However, an operator console in the FG DCS 110 would not generally be able to operate on data that was specific to the SG DCS 130 (e.g., other newer controllers). It is noted that a typical MG-DCS system would have many more than the 9 nodes shown in FIG. 1.

The plurality of FG client nodes in FIG. 1 are shown as nodes 111-114 that are connected to a local control network (LCN) 120. As used herein and known in the art, a LCN is a local area network through which a plurality of modules communicate with each other. LCN is provided by Honeywell International Inc. Multiple LCNs can be linked together through network gateway nodes which provide both media and protocol conversion. Two coaxial cables provide the primary medium that connects each module residing on a LCN. The LCN carries all of the information that is transferred between the modules, including information going to or from the modules, and information going to or from process subsystems integrated into the associated DCS 110. A "token-passing" technique can be used to control access to the LCN. A token frame is passed among the modules to determine which one has access to the network. The LCN is a broadcast type of local area network. All modules "hear" all transmissions, but they accept only information intended for them.

The plurality of FG client nodes 111-114 include a first plurality of field devices and one or more control devices. Field devices as used herein include gauges, valves, transmitters, actuators, and sensors. For example, any one or more of the client nodes 111-114 may be a sensor node having one or more associated sensors, or an actuator node having one or more associated actuators, or an application controller node that performs a control process, or a combination of any these types of nodes. Any one or more of the nodes may have embedded processors or may be embodied as a computer system such as a personal computer (PC).

SG DCS 130 includes a plurality of SG client nodes including at least a first SG node 132, a second SG node 133, a third SG node 134, and a fourth SG node 135, all connected to a non-LCN data highway 140, shown as the Fault Tolerant Ethernet (FTE) shown. FTE provide redundant data pathways to increase reliability. In FTE, the data primarily travels through one of the two cables shown, and in cases of failures the data then travels over the other cable. The non-LCN data highway 140 uses a data protocol that is not compatible with the data protocol used on the LCN 110, such as TCP/IP in one example. In conventional TCP/IP, TCP provides the service of exchanging data directly between two network hosts, whereas IP handles addressing and routing message across one or more networks. The TCP segment includes a segment header and a data section. Node 134 is shown supporting an operator console 134(a), which allows an operator to supervise and control the client nodes in both FG DCS 110 (111-114) as well as the SG DCS client nodes (132-135) or server node 131.

The data highway protocol in SG DCS 130 may also comprise standard (single cable) Ethernet, wireless or optical network as alternative to FTE. SG Client nodes 132-135 are generally equivalent nodes in all respects, all acting as clients to the server node 131, and additionally may include one or more features/functions of a Global User Station (GUS)/User Station (US) Node from the FG DCS 110, such as a Native Window (NW) application, and GUS picture Runtime. The plurality of SG client nodes 132-135 include a second plurality of field devices, wherein the plurality of SG nodes each include a stored client LCNP emulator software component 144 that emulates a function of a LCNP board. The LCNP Emulator software component 144 has its own LCN Address that can be configured in the system's history module (HM) and can be viewed as a separate node in NW under system status. The LCNP Emulator software 144 performs all normal operations as would be done on a T-Node with a physical LCNP Board 146. The server node 131 is connected between the LCN 120 and the data highway 140. The LCNP board 146 shown on the server node 131 provides a physical interface between the FG DCS 110 and the SG DCS 130.

Server node 131 includes a server 148, a physical LCNP board 146, and data translation and destination addressing software 147 which defines a separate and unique LCN Address slot 132'-135' for each of the SG DCS client nodes 132-135. A user can configure the LCN address slots using the data translation and destination addressing software 147.

For example, LCN address slot 132' can correspond to SG DCS node 132, LCN address slot 133' can correspond to SG DCS node 133, LCN address slot 134' can correspond to SG DCS node 134, and LCN address slot 135' can correspond to SG DCS node 135. As noted above, the LCNP emulator board 146 provides a physical interface between the FG DCS 110 and the SG DCS 130, and in the MG-DCS system 100 shown in FIG. 1, provides the only communication channel between these respective DCS.

In a conventional plant DCS, SG client nodes 132-135 being T-Nodes would each require hardware comprising a dedicated LCNP board 146 to interface to allow communications with the nodes 111-114 on the LCN 120 associated with FG-DCS 110. As described above, T-nodes act as an interface to access the data/alarms from the FG-DCS 110. By providing LCNP emulator software 144 at the client nodes 132-135 in the SG-DCS 130, disclosed embodiments eliminate the need to have physical LCNP boards on SG client nodes 132-135. Note that there is only one LCNP Board 146 in the complete MG-DCS 100 system and the LCN data from LCN 120 is processed by a server LCNP emulator software component comprising client data translation and destination addressing software 147 for transmission over the data highway 140 shown as FTE for the SG DCS client nodes 132-135 to access.

Translated data translation and destination addressing software 147 also allows data from nodes in the SG-DCS 130 to communicate with nodes in the FG-DCS 110. Thus, the SG DCS client nodes 132-135 can also write/send data to the nodes in the FG DCS 111-114 through the server node 131. For communications from SG-DCS nodes 132-135 to FG-DCS nodes 111-114, the translated data translation and destination addressing software 147 on the server node 131 converts the non-LCN data highway protocol shown as FTE data to LCN Data.

The addressing for nodes in the SG DCS 130 in MG-DCS system 100 can be handled in a way similar to treatment in a conventional FG DCS, where each of the client nodes on the FG DCS 111-114 has a unique address and the nodes read/write data to node destinations based on these addresses. With the client LCNP Emulator Software 144, the client nodes 132-135 on the SG DCS 130 also receive a unique address similar to addressing used in the FG DCS 110. This renders the nodes 131-135 on SG DCS 130 effectively part of the FG DCS System 110 and would hence behave (read/write data) in a manner similar. A difference for communications involving the SG DCS nodes 132-135 with a node in the FG DCS 110 is that the LCNP Emulator Software 144 is used as a communication interface between client nodes 132-135 in the SG DCS System 130 and client nodes 111-114 in the FG DCS System 110.

As known in the art, nodes in MG-DCS 100 can include a plurality of physical modules at its nodes. For example, modules can include a universal operator station module ("operator module" or "US") such as operator console 134(a) shown in FIG. 1, an application module ("AM"), a history module ("HM"), a computer module ("CM"), and possibly duplicates of these modules (and additional types of modules, not shown) as necessary to perform the required control/supervisory function of the process being controlled.

The US is a workstation for one or more plant operators. It includes an operator console that is the interface between the plant operator, or operators, and the process or processes of the plant for which they are responsible. Each US and any backup modules (not shown), for example, is connected to the LCN 120 if in FG DCS 110 or data highway 140 if in SG DCS 130. Each US includes a visual presentation including, for instance, a conventional display device, that, in turn, includes a video display generator, an operator keyboard, a floppy disk data storage device, trend pen recorders, status displays or the like, for example (not shown).

Another type of physical module generally included in MG-DCS 100 is a HM that provides mass data storage capability. Each HM includes at least one conventional disk mass-storage device that provides a large volume of storage capability for binary data. The types of data stored by such mass storage device are typically trend histories or data from which such trends can be determined, data that constitute or form displays, copies of programs for the units of process controllers. Another type of module incorporated into MG-DCS 100 is AM. AM provides additional data processing capability in support of the process control functions performed by process controllers, such as data acquisition, alarming, batch history collection and providing continuous control computational facilities when needed. The data processing capability of AM is provided by its module processor and module memory.

CM may use standard or common units of all physical modules to permit a medium-to-large scale, general-purpose data processing system to communicate with other modules of MG-DCS 100. Data processing systems of CM are used to provide supervision, optimization, generalized user program preparation and execution of such programs in higher-level program languages. Typically, the data processing systems of CM have the capability of communicating with other such systems by a communication processor and communication lines, as is well known in the art. CM may include one of several kinds of computers and operating systems.

Figure 2:
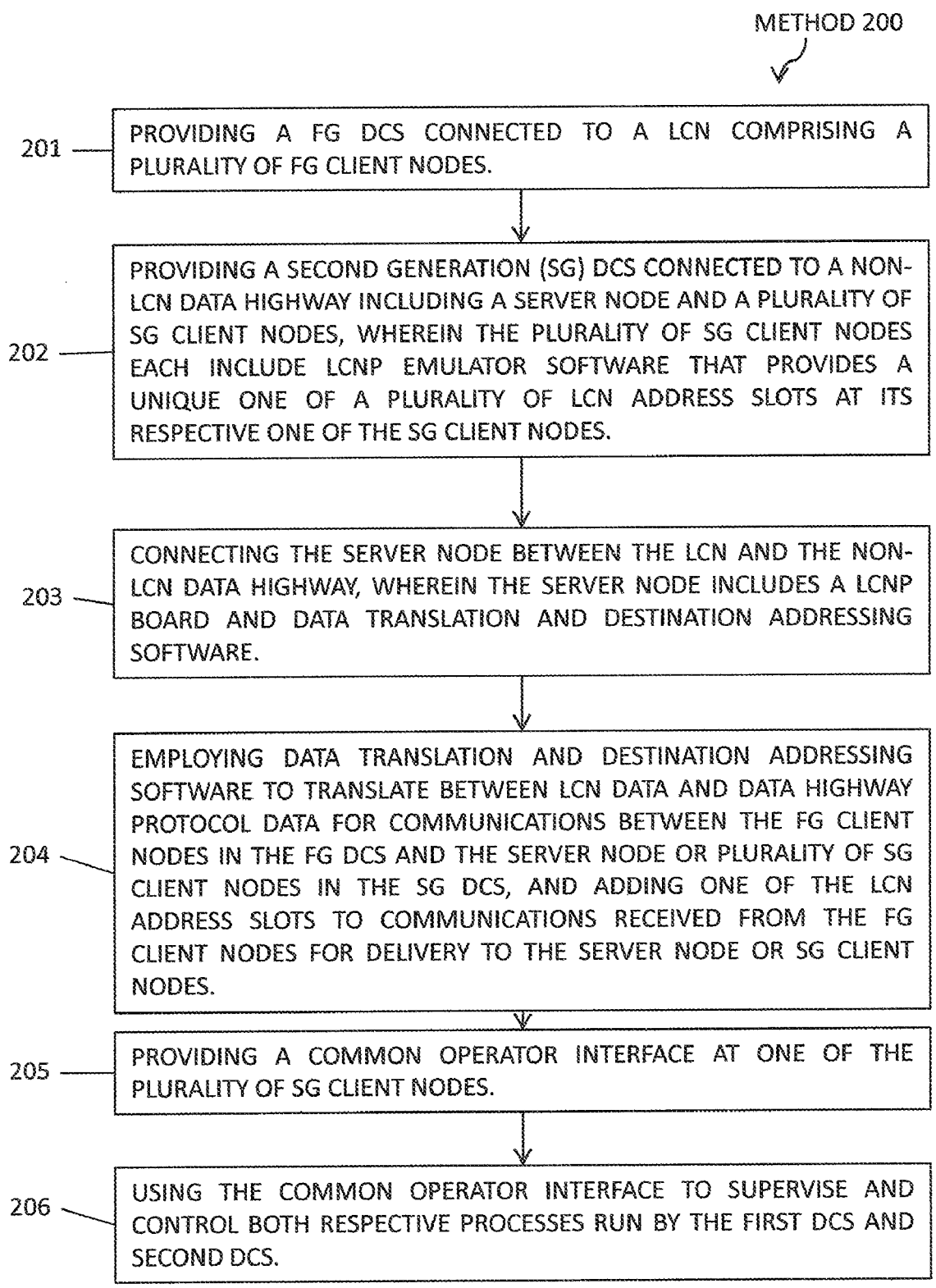
FIG. 2 is a flow chart showing steps in an example method of controlling plant operations for a multi-generation DCS (MG-DCS), according to a disclosed embodiment.

FIG. 2 is a flow chart showing steps in an example method 200 of controlling plant operations for a MG-DCS, according to a disclosed embodiment. Step 201 comprises providing a FG DCS connected to a LCN comprising a plurality of FG client nodes including a first plurality of field devices. Step 202 comprises providing a SG DCS connected to a non-LCN data highway including a server node including a server and a plurality of SG client nodes including a second plurality of field devices, wherein the plurality of SG client nodes each include LCNP emulator software that provides a unique one of a plurality of LCN address slots at its respective one of the plurality SG client nodes. Step 203 comprises connecting the server node between the LCN and the non-LCN data highway, wherein the server node includes a LCNP board and data translation and destination addressing software. In step 204 the data translation and destination addressing software is employed to translate between LCN data and data highway protocol data for communications between the plurality of FG client nodes in the FG DCS and the server node or plurality of SG client nodes in the SG DCS, and add one of the LCN address slots to communications received from the FG client nodes for delivery to the server node or SG client nodes.

In a typical embodiment, the FG DCS comprises a first plurality of field devices including at least one sensor or actuator and the second DCS comprises a second plurality of field devices including at least one sensor or actuator. In this embodiment, method 200 can further comprise step 205 comprising providing a common operator interface at one of the plurality of SG client nodes, and step 206 comprising using the common operator interface to supervise and control both respective processes run by the first DCS and second DCS.

Benefits of disclosed embodiments include significant cost avoidance in cases where new T-Nodes are required, including physical LCNP cards and physical machines. Disclosed embodiments can also be used for specific function testing where performance or stability is not being focused on.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

Computer program code for carrying out operations of the disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

We claim:

1. A multi-generation distributed control system (MS-DCS) comprising:
    a first generation (FG) DCS, comprising hardware, connected to a local control network (LCN) comprising a plurality of FG client nodes;
    a second generation (SG) DCS connected to a non-LCN data highway including a server node including a server and a plurality of SG client nodes, wherein said server node is connected between said LCN and said non-LCN data highway and includes a LCN processor (LCNP) board, and
    LCNP emulator software including a server LCNP emulator software component at said server node and a client LCNP emulator software component at each of said plurality of SG client nodes,
    wherein said server LCNP emulator software component (i) translates between said LCN data and data highway protocol data for communications between said FG DCS and said SG DCS and (ii) adds one of a plurality of LCN address slots that each correspond to one of said plurality of SG client nodes to communications received from said LCN for delivery to said server node or said plurality of SG client nodes in said SG DCS;
    wherein each of said client LCNP emulator software components provides one of said plurality of LCN address slots at its respective one of said plurality SG client nodes.

2. The MG-DCS of claim 1, wherein said plurality of LCN address slots are user programmable at said server LCNP emulator software component and said client LCNP emulator software components.

3. The MG-DCS of claim 1, wherein said non-LCN data highway comprises an Ethernet network.

4. The MG-DCS of claim 3, wherein said Ethernet network comprises a fault tolerant Ethernet network.

5. The MG-DCS of claim 1, wherein said plurality of SG client nodes are all exclusive of said LCNP board.

6. The MG-DCS of claim 1, wherein said data highway protocol data comprises TCP/IP Protocol data.

7. The MG-DCS of claim 1, wherein said FG DCS comprises a first plurality of field devices including at least one sensor or actuator and said second DCS comprises a second plurality of field devices including at least one sensor or actuator.

8. The MG-DCS of claim 7, further comprising an operator console at one of said plurality of SG client nodes for an operator at said operator console to supervise and control both said first plurality of field devices in said FG DCS and said second plurality of field devices in said SG DCS.

9. A method of controlling plant operations for a multi-generation DCS (MG-DCS) comprising:
    providing a first generation (FG) DCS connected to a local control network (LCN) comprising a plurality of FG client nodes;
    providing a second generation (SG) DCS connected to a non-LCN data highway including a server node including a server and a plurality of SG client, wherein said plurality of SG client nodes each include LCNP emulator software that provides a unique one of a plurality of LCN address slots at its respective one of said plurality SG client nodes;
    connecting said server node between said LCN and said non-LCN data highway, said server node including a LCN processor (LCNP) board and data translation and destination addressing software, and
    employing said data translation and destination addressing software to translate between said LCN data and data highway protocol data for communications between said plurality of FG client nodes in said FG DCS and said server node or said plurality of SG client nodes in said SG DCS, and adding one of said plurality of LCN address slots to communications received from said FG client nodes for delivery to said server node or said plurality of SG client nodes.

10. The method of claim 9, wherein said FG DCS comprises a first plurality of field devices including at least one sensor or actuator and said second DCS comprises a second plurality of field devices including at least one sensor or actuator, further comprising:
    providing a common operator interface at one of said plurality of SG client nodes, and
    using said common operator interface to supervise and control both respective processes run by said first DCS and said second DCS.

11. The method of claim 9, wherein said plurality of LCN address slots are user programmable, further comprising a user programming said plurality of LCN address slots into said data translation and destination addressing software, and said user programming said unique one of said plurality of LCN address slots into said LCNP emulator software at respective ones of said plurality SG client nodes.

12. The method of claim 9, wherein said LCNP board is exclusively at said server node in said MG-DCS.

13. The method of claim 9, wherein said non-LCN data highway comprises an Ethernet network.

14. The method of claim 9, wherein said data highway protocol data comprises TCP/IP Protocol data.

15. The method of claim 9, wherein said server node is an exclusive path for communications between said plurality of FG client nodes in said FG DCS and said server node or said plurality of SG client nodes in said SG DCS.

* * * * *